July 22, 1969  H. B. RIBLET ET AL  3,456,350

MECHANICAL ANALOG COMPUTER FOR SATELLITE TRACKING ANGLES

Filed Feb. 14, 1967  4 Sheets-Sheet 1

HENRY B. RIBLET
IRVIN H. SCHROADER
INVENTORS

BY  J. O. Tresansky
ATTORNEY

HENRY B. RIBLET
IRVIN H. SCHROADER
INVENTORS

United States Patent Office 3,456,350
Patented July 22, 1969

3,456,350
MECHANICAL ANALOG COMPUTER FOR
SATELLITE TRACKING ANGLES
Henry B. Riblet, Kensington, and Irvin H. Schroader,
Rockville, Md., assignors to the United States of
America as represented by the Secretary of the Navy
Filed Feb. 14, 1967, Ser. No. 616,446
Int. Cl. G01c 21/20; G01b 3/14, 5/24
U.S. Cl. 33—1                                    9 Claims

ABSTRACT OF THE DISCLOSURE

The present invention relates to an improved mechanical analog computer for calculating the directions to which a signal seeking antenna must point in order to continually follow a signal sending satellite throughout a portion of its circular orbit. The device comprises a spherical bearing, representing the position of a satellite, and means for pivoting the bearing to simulate the angular motion of a satellite in a circular orbit. An elongated pointer rod is attached radially to the surface of the bearing and is constrained by a sleeve bearing to point continuously to a fixed point representing the location of an antenna on the earth's surface. Thus, when the spherical bearing is pivoted at a rate matching the expected orbital period of a satellite, the pointer rod will continuously follow the spherical bearing. Its instantaneous alignment, through the representative locations of both the satellite and the antenna, will indicate the line of sight of the antenna to any single position of the satellite. Means are provided on the device for serially plotting the pointer rod alignment to result in a time dependent program of directions to which an actual antenna must point in order to continuously track a satellite throughout a portion of its orbit.

This invention relates generally to an improved and special purpose mechanical analog computer and, more particularly, to a computer for calculating the direction angles to which a signal seeking antenna must point in order to continually follow a satellite throughout a portion of its circular orbit.

Effective telemetry of satellite signals demands that a receiving antenna of a tracking station closely track the path of a satellite throughout its flight path in order to receive a maximum signal therefrom. Such close tracking is assured by preparing, long before the expected satellite pass, a time-dependent tracking program to which the signal seeking antenna must conform in order that its tracking pattern may correspond to the expected line of travel of the satellite or by using an expensive automatic tracking system. Heretofore, preparation of the time dependent program required many hours of tedious hand calculations or expensive computer operations coupled with time consuming accuracy verification. The present invention was developed in response to this existing problem and compirses a mechanical analog computer, the outputs of which may be converted to angle readouts in either analog or digital form of satellite positions with respect to the ground station. The computer thus may provide quick and accurate time dependent tracking angles without a need for accuracy verification. Alternatively, the device may be used to drive directly the servos of a tracking antenna, thereby dispensing with the need for a prepared tracking program.

It is therefore an object of the invention to provide a device which will compute the coordinates to which an antenna must point in order that it may continuously follow a signal sending satellite through a circular or nearly circular orbit.

A further object of the invention is to provide a device for determining a time dependent program of satellite positions with respect to a fixed point on the earth from a knowledge of the time of satellite rise above the horizon, the highest elevation angle, and the azimuth of either the satellite rise or the closest approach of the satellite.

Another object of the invention is to provide a mechanical analog computer utilizing a gimbal system of scaled proportions for determining a time dependent program of satellite positions with respect to a fixed point on the earth.

A further object of the invention is to provide a gimbal system of scaled proportions for maintaining the alignment of a pointer rod through a first fixed reference point and a second translating reference point and means for plotting either the azimuth and elevation or the direction angles about orthogonal axes of the pointer rod versus time to result in a time dependent program of coordinates to which an antenna must point in order to continuously follow a signal sending satellite through a circular or nearly circular orbit.

A still further object of the invention is to provide a mechanical computer which will calculate the instantaneous position, with respect to a fixed point on the earth, of a satellite in a circular or nearly circular orbit, which orbit may have any known orbit plane or known period.

Other objects and many of the attendant advantages of the present invention will be readily appreciated as the same becomes better understood by reference to the following detailed description when considered in conjunction with the accompanying drawings, wherein.

Figure 4:
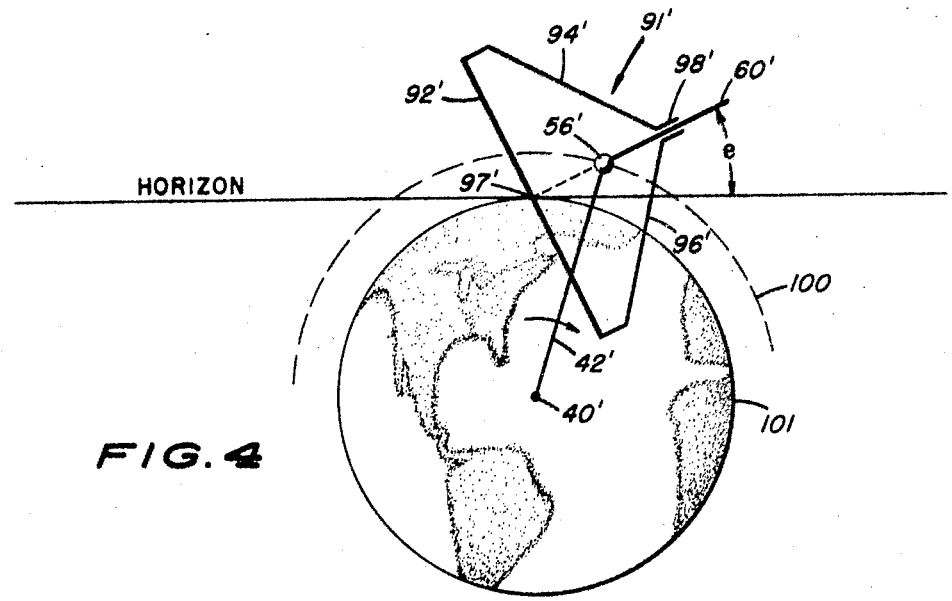
Figure 5:
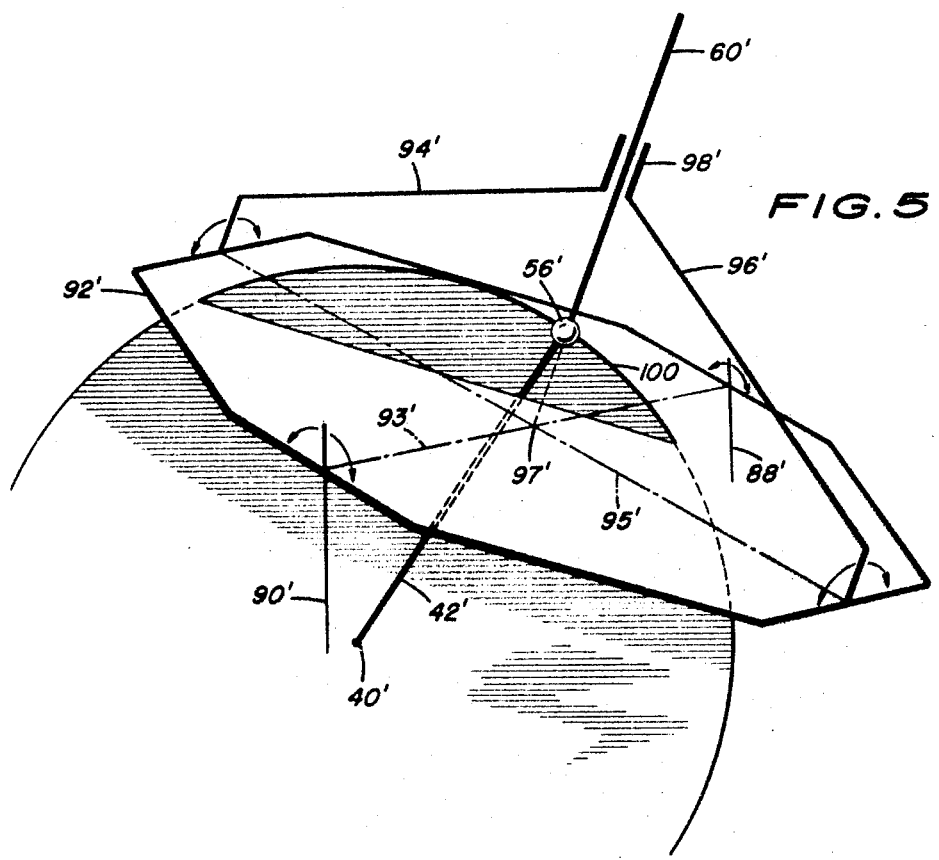

FIG. 4 is a simplified diagrammatic representation of the gimbal system showing its mode of operation for following a satellite in an orbit whereby the anticipated path of the satellite would pass directly over the tracking station; and FIG. 5 is a diagrammatic representation of the gimbal system showing its mode of operation for following a satellite in an orbit slightly different from the orbit shown in FIG. 4.

Figure 1:
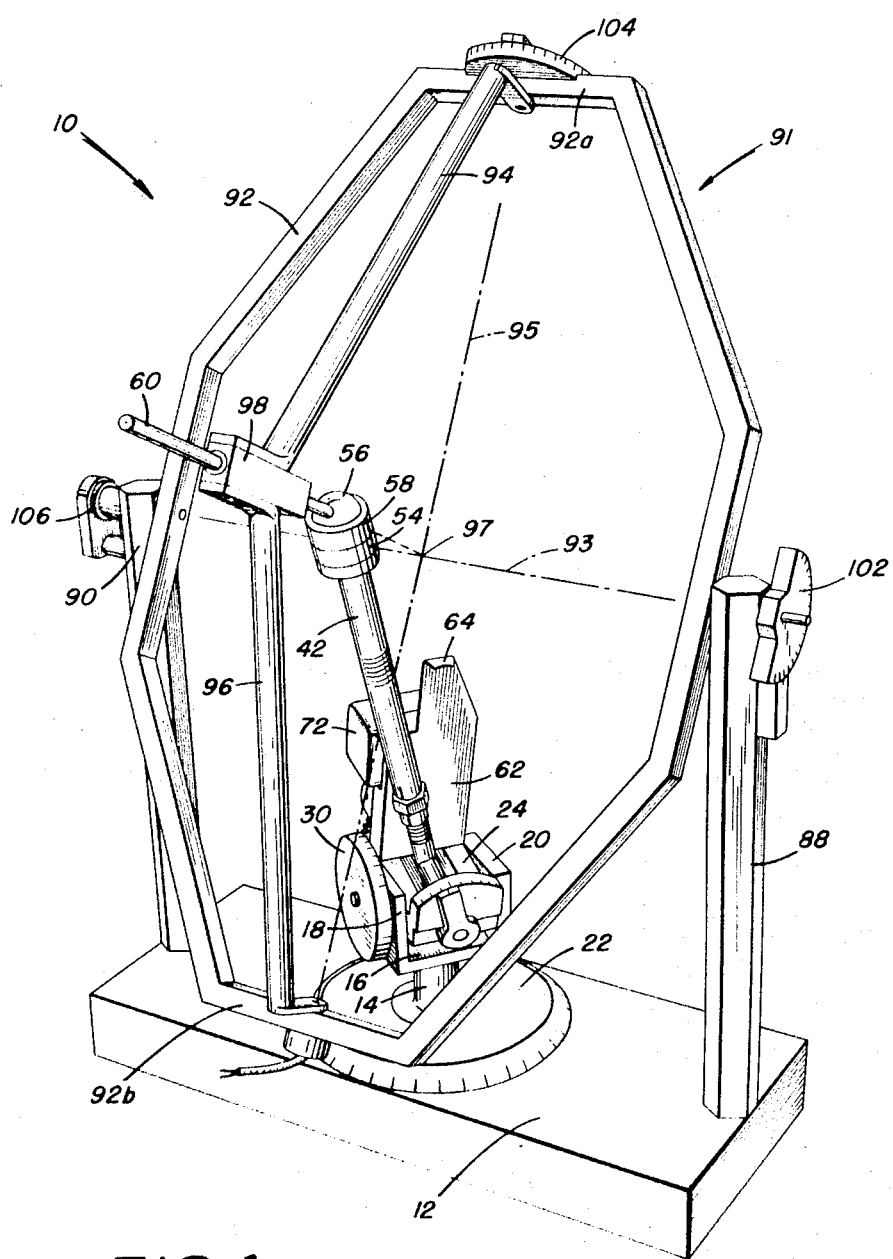
FIG. 1 is a perspective of the mechanical analog computer illustrating in particular the gimbal system, the pointer rod and the drive means for the orbit drive shaft.

Referring to the drawings, FIG. 1 shows a mechanical analog computer, indicated generally at 10, comprising a substantially flat rectangular base 12 upon which is vertically mounted a rotatable shaft 14 which supports a generally rectangular carriage 16, which carriage includes a sidewall 18 and a sidewall 20. The carriage 16 may be rotated on the shaft 14 to a desired azimuth, for a purpose to be hereinafter explained, and the shaft 14 may be provided with a protractor 22, which is rotatable along with said carriage 16 to indicate the azimuth position of said carriage. As more clearly shown in FIG. 2, the sidewalls 18 and 20 are provided therebetween with a bearing block 24, which is pivotally mounted on the sidewalls 18 and 20 by a pair of aligned shafts 26, 28 and which is pivotable about an axis coincident with the axes of the aligned shafts. A protractor 30 is attached to the sidewall 18 for indicating the pivoted position of the bearing block 24. As best seen in FIG. 3 the bearing block 24 may be provided with a peg 32 on which is threaded a thumb screw 34, which peg protrudes through an annular slot 36 in the sidewall 20 (a portion of said slot 36 also being shown in FIG. 2). It can be readily seen that pivotal movement of the bearing block 24 will cause displacement of the peg 32 along the annular slot 36. Thus, tightening of the thumb screw 34 so that it engages the sidewall 20 will prohibit displacement of the peg 32 and prevent undesired pivotal movement of the bearing block.

Figure 2:
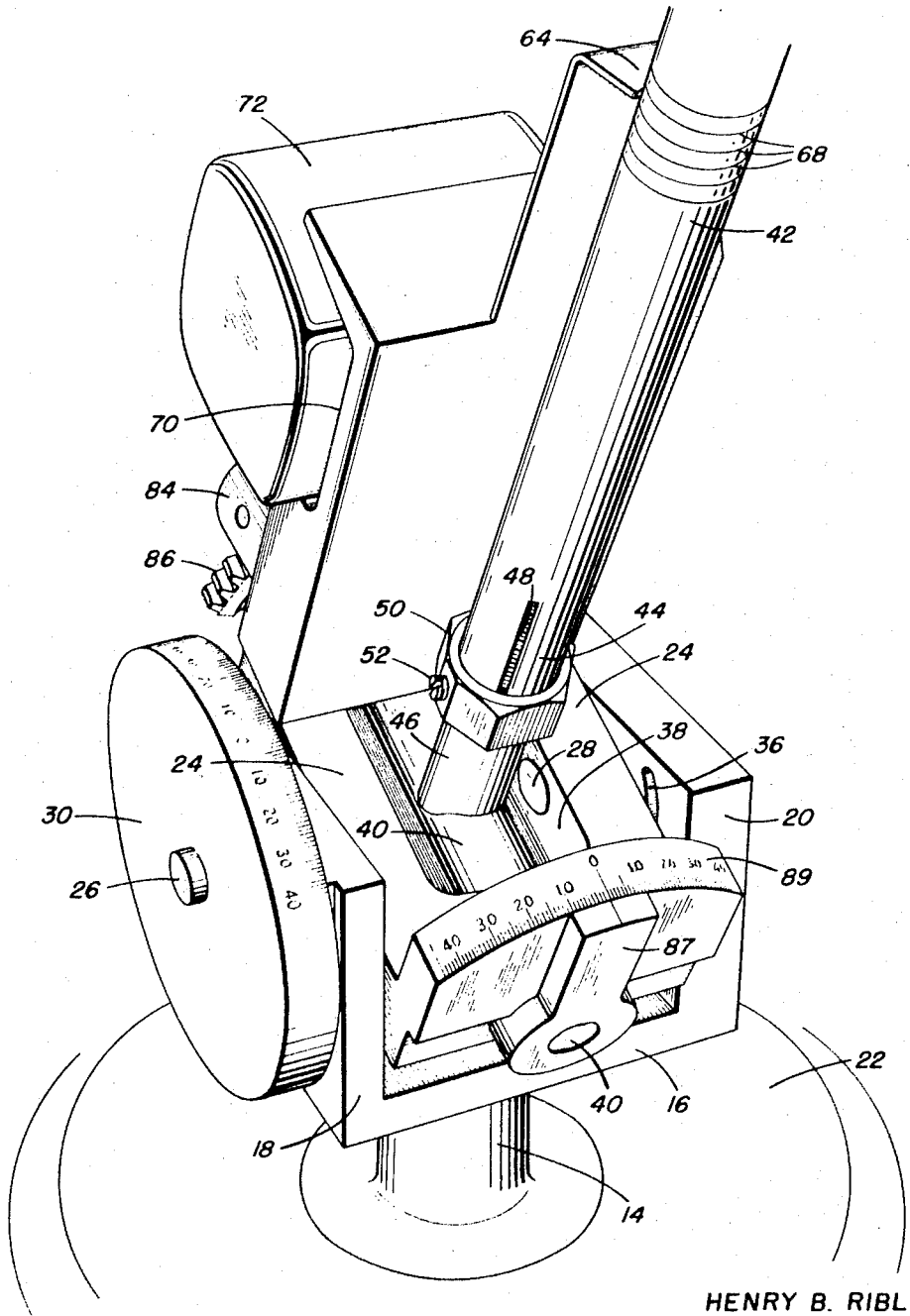
FIG. 2 is a perspective of a portion of the mechanical analog computer of FIG. 1 illustrating the rotatable carriage and the orbit plane shaft and orbit drive shaft in a bearing block which is pivotally mounted in said carriage.
Figure 3:
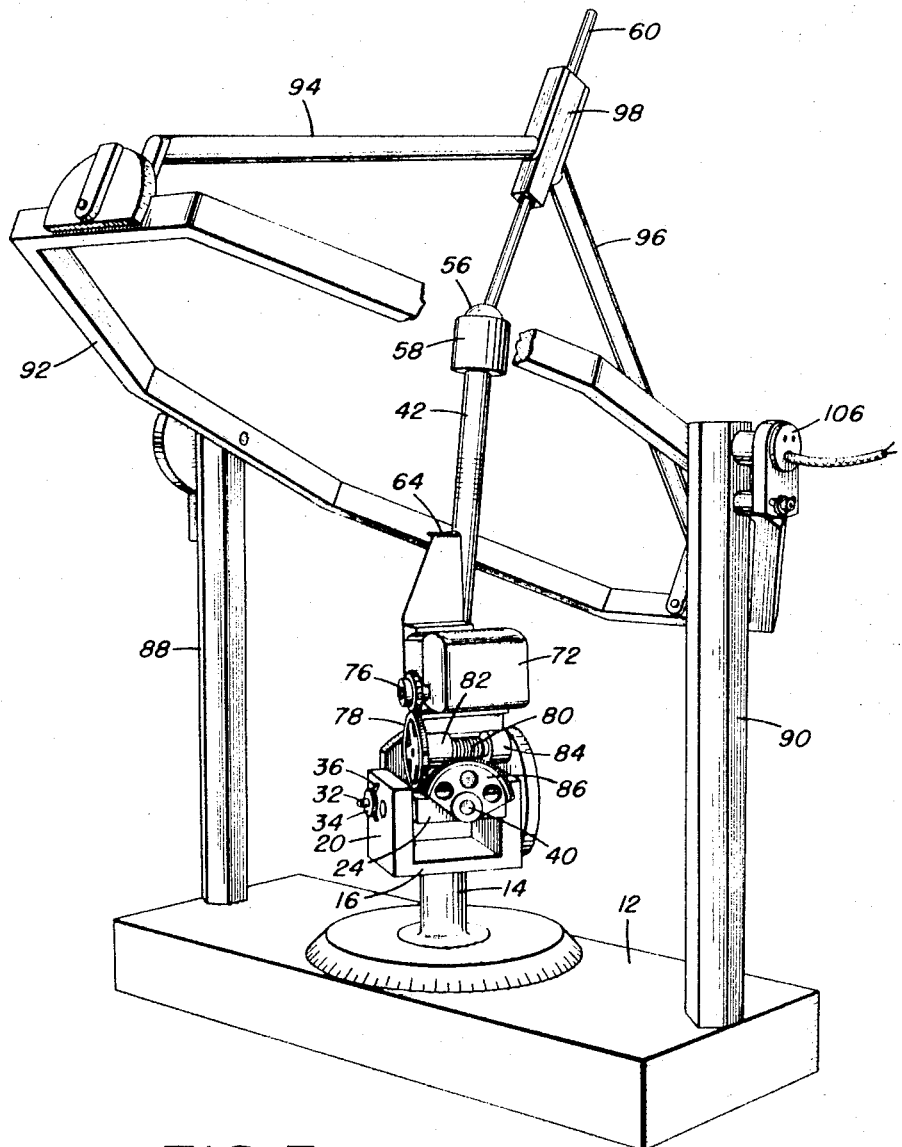
FIG. 3 is a perspective of the device of FIG. 1 illustrating the particular drive means for the orbit drive shaft and its associated gearing.

With reference to FIG. 2, the bearing block 24 has a rectangular cutout portion 38 exposing a length of an orbit drive shaft 40, mounted in the bearing block 24 for rocking movement about an axis perpendicular to the pivotal axis of said bearing block. An elongated, substantially cylindrical orbit plane shaft 42 has a tubular internally threaded end portion 44 which is screwed on an externally threaded cylindrical stem 46 rigidly secured perpendicular to the exposed portion of the orbit drive shaft 40. The orbit plane shaft 42 is adjustable on the stem 46 to effect a precise adjustment of its effective length, for a purpose to be later set forth in detail. The tubular end portion 44 of the orbit plane shaft is provided with at least one longitudinal groove 48 and is surrounded by a nut 50 having a radially directed tightening screw 52. Tightening of the screw 52 partially compresses the tubular end portion 44 radially on the stem 46 and prohibits undesired relative movement between the orbit plane shaft 42 and said stem. On the terminal end of the orbit plane shaft 42, as shown in FIG. 1, is a cylindrical seat 54 for receiving a large spherical bearing 56. A cap 58 retains the spherical bearing on the seat 54. An elongated cylindrical pointer rod 60 is attached radially to the spherical surface of said bearing 56, as by welding, which spherical bearing provided a substantially frictionless universal connection between the pointer rod 60 and the terminal end of the orbit plane shaft 42. From the description set forth thus far it may be seen that the orbit plane shaft 42 may be selectively pivoted to a desired elevation by pivoting the bearing block 24 about the shafts 26 and 28. The orbit plane shaft, pivoted thereby to a desired elevation, may then be oriented to a selected azimuth merely by rotation of the carriage 16 on the shaft 14. The particular purpose for a desired azimuth and elevation orientation of the orbit plane shaft 42 will be hereinafter explained in the description of the invention's operation.

By reference to FIGS. 1 and 2, the bearing block 24 includes a generally vertical portion 62, mounted at a right angle to said block. The vertical portion 62 is extended and bent toward the orbit plane shaft 42 and cooperates with markings on said shaft 42 to define a gauge 68 for indicating precisely the adjusted length thereof. The generally vertical portion 62 of the bearing block 24 is provided with a recess 70 to accommodate a variable synchronous motor 72 which may be secured in the recess in any desired manner. With more particular reference to FIG. 3, the synchronous motor 72 includes an output pinion 76 operably engaging a complementary gear 78 which is rotatable on the shaft of a worm gear 80, retained for rotation in a pair of aligned bearing blocks 82 and 84 on said upper portion 62 of the bearing block 24. Operably engaged on the worm gear is a bevel sector gear 86 which is keyed to the terminal end of the orbit drive shaft 40, which shaft extends externally of the pivotable bearing block 24. The synchronous motor 72 and the above-mentioned gearing associated therewith comprise drive means for the rockable orbit drive shaft 40 and means for pivoting the orbit plane shaft 42 and moving the spherical bearing 56 in simulation of the angular motion of a satellite in a circular orbit. The pivoting of the shaft 42 may occur in a plane having an elevation determined by the selected degree to which the bearing block 24 may be pivoted and an azimuth determined by the azimuth selection to which the carriage 16 may be rotated on the shaft 14. A pointer 87 is provided on the terminal end of the orbit drive shaft 40 and cooperates with an arcuate scale 89 to provide an accurate visual indication of the pivoted position of the orbit plane shaft 42.

As can be seen in FIGS. 1 and 3, a pair of uprights 88 and 90 are mounted in spaced relationship upon the base 12 and rotatably support therebetween a gimbal linkage system, indicated generally at 91 and comprising a generally elliptical hoop 92, above the pivotal bearing block 24 and the rotatable carriage 16. The hoop 92 is pivotable on the uprights 88 and 90 about a first orthogonal axis 93 of the gimbal system. A first gimbal arm 94 is pivotally fastened to the hoop 92 medially of the portion 92a which is parallel to the axis 93, and a second gimbal arm 96 is similarly fastened to the portion 92b of said hoop, directly opposite the first gimbal arm 94. The gimbal arms 94 and 96 are pivotable about a second orthogonal axis 95 of the gimbal system, which second orthogonal axis intersects the first orthogonal axis at a fixed point of intersection 97 always in a plane defined by the perimeter of the elliptical hoop 92. The gimbal arms 94 and 96 are of equal length, are inclined with respect to the plane defined by the perimeter of the elliptical hoop 92, and are connected at their corresponding inner ends to an elongated sleeve bearing 98. The elongated cylindrical pointer rod 60 is slidably received in the sleeve bearing 98, which bearing maintains the pointer rod 60 continually in a direction pointing toward the intersection of the first and the second orthogonal axes of the gimbal system. The pointer rod 60 thus is constrained to point in a direction intersecting two points, namely the center of the spherical bearing 56 on the end of the pivotable orbit plane shaft and the point of intersection 97 of the first and the second orthogonal axes of the gimbal system. Thus, if the intersection 97 of the gimbal system axes were to represent a location on the earth's surface whereon a signal-seeking antenna is positioned, and the center of the spherical bearing 56 were to represent the position of a satellite with respect to the representative location 97 of the antenna, the constrained alignment of the pointer rod 60 would indicate the line of sight of the antenna.

For a more detailed discussion of the operation of the device, reference may be made to FIG. 4 of the drawings wherein primed numerals are indicative of diagrammatic representations of the structural members designated by the numerals of FIGS. 1–3. Accordingly, with reference to FIG. 4, 97' represents the location of the antenna (point of intersection 97 of the gimbal axes) and 56' represents the position of a satellite in an orbit 100. The pointer rod 60 is represented at 60'. The gimbal system 91 is diagrammatically shown at 91' and includes the hoop 92, shown edgewise at 92', and the gimbal arms, shown at 94' and 96' and the sleeve bearing 98, which is shown at 98' contraining the pointer rod 60' to point in a direction aligned with the points 97' and 56'. The effective length of the orbit plane shaft 42, universally attached to the spherical bearing 56, is represented at 42' which length may be selected, by precise adjustment as heretofore described, to represent, according to scaled proportions, the distance of the satellite orbit 100 from the earth's center, represented by the point 40'. In addition, since the orbit plane shaft 42 may be pivoted about the orbit drive shaft 40 to simulate the angular motion of a satellite in a circular orbit, it should be apparent that the orbit plane shaft 40 is pivotable in a plane corresponding to the orbit plane of the simulated satellite motion. Accordingly, with reference to FIG. 4, the orbit plane shaft 42' may be pivoted at a desired angular rate about the point 40' and in the direction shown by the arrow to simulate angular movement of the satellite position 56' about the earth 101. Since the approximate triangular geometry defined by the hoop 92', the gimbal arm 94' and the pointer rod 60' will remain unchanged, pivotal movement of the orbit plane shaft 42' will result in rotatable movement of the hoop 92' about the first orthogonal axis of the gimbal system. The angle to which the hoop 92' rotates will be an indication of the elevation $e$ of the pointer rod 60' and also of the signal seeking antenna's line of sight. Thus, for a single simulated position of the satellite there is but a single corresponding angle to which the hoop 92' will be pivoted. Likewise, for said single position of the satellite there is but one corresponding angular position of the gimbal arms 94' and 96' about the second orthogonal gimbal axis 95. Therefore, the instantaneous angular positions of the hoop 92' and the gimbal arms 94' and 96' will define angular orthogonal cordinates for the mentioned line of sight of the antenna. As shown in FIG. 1, a scale 102 is provided on the upright 88 for visually indicating the instantaneous angular position of the hoop 92 about the orthogonal axis 93. A second scale 104 is provided on the hoop 92 for indicating the instantaneous angular position of the gimbal arms 94 and 96 about the second orthogonal axis 95. Additionallly, each scale may be provided with companion servo-type potentiometers, as the one shown at 106, or digital shaft encoders (not shown) which may be operable throughout the motion of the orbit plane shaft 42. The outputs of such potentiometers would be specifically convertible by well-known means to analog voltage readouts or digital coding in serial form comprising a time dependent tracking program for the signal-seeking antenna. Alternatively, the outputs may be used to drive directly the servos of the antenna itself, thereby dispensing with the need for a prepared tracking program.

FIG. 5 is a diagrammatic representation of the gimbal system illustrating in greater detail its mode of operation. As can be seen by reference to FIG. 5, the movement of the represented satellite 56' takes place in the orbit plane 100, which plane may have a certain azimuth and elevation with respect to the simulated position 97' of the antenna on the earth's surface. As has been heretofore explained, the orbit plane shaft 42' is pivotable in the expected orbit plane of the simulated satellite 56'. Therefore, the azimuth and elevation of the orbit plane shaft may be oriented to correspond to the azimuth and elevation of the expected orbit plane by pivotally adjusting the bearing block 24 and rotatably adjusting the carriage 16. Thus, by proper orientation of the orbit drive shaft, its pivotal motion will properly take place in the expected orbit plane. As particularly shown in FIG. 5, the orbit drive shaft 42' is pivotable in the orbit plane 100. Upon pivotal motion of the orbit drive shaft 42', the hoop 92', supported on the uprights 88' and 90', will pivot about the first orthogonal axis 93' and the gimbal arms 94' and 96' will pivot about the second orthogonal axis 95'.

For any single satellite pass a limited number of known parameters are available, namely, the satellite rise time and rise azimuth position, the closest approach azimuth and elevation, and the set time and azimuth position. According to one of the objects of the invention, the device may be initially set up according to these limited parameters so that its subsequent operation will result in a correct time dependent following program for an entire satellite pass. Thus, to set-up the device correctly, the rotatable carriage 16 must be rotated to an azimuth corresponding to the azimuth of the expected satellite closest approach, which corresponding azimuth may be read on the protractor 22. The orbit drive shaft must be rotated until the pointer 87 reads "zero" on the elevation scale 89. The pivotable bearing block 24 must then be pivoted on the carriage 16 until the orbit plane shaft 42 has an elevation corresponding to the closest approach elevation, which corresponding elevation may be read on the protractor 30. The motor 72 must then be energized to drive the orbit plane shaft 42 until the pointer rod 60 is caused to point to a substantially horizontal position, which position should correspond either to the satellite rise position or to the satellite set position. Since either of these positions are known parameters, they each provide a value against which the horizontal position of the pointer rod may be checked for proper alignment. If the pointer rod is found to be misaligned, the azimuth of the rotatable carriage 16 must be adjusted, with the pointer rod 42 remaining horizontal, until the alignment of the pointer rod indicates the corresponding satellite rise or set position.

Obviously, many modifications and variations of the present invention are possible in the light of the above teachings.

What is claimed is:

1. A mechanical analog computer, comprising
   means for indicating a representative position of a satellite in orbit, said means comprising a gimbal system including hoop means pivotal about a first orthogonal axes of said gimbal system,
   means engaging said first-mentioned means for imparting translational motion to said first-mentioned means to simulate the angular motion of a satellite in orbit,
   pointing means on said first-mentioned means for indicating by its alignment the line of sight from a representative antenna position to the representative satellite position, and
   means engaging said pointing means for visually indicating alignment of said pointing means.

2. The structure of claim 1, wherein said indicating means further comprises a pair of gimbal arms pivotally affixed to said hoop and pivotable about a second orthogonal axis of said gimbal system.

3. The structure of claim 2, and further including
   means constraining said pointing means to point continuously to a fixed point representative of an antenna position.

4. The device of claim 2, and further including
   means on said hoop for continuously indicating its angular position about the first orthogonal axis, and
   means on one of said gimbal arms for continuously indicating its angular position about the second orthogonal axis.

5. A mechanical analog computer comprising,
   a base,
   a bearing block on said base,
   an orbit plane shaft pivotally mounted on said bearing block,
   means for pivoting said orbit plane shaft at a constant angular velocity,
   a pointer rod attached for universal movement on said orbit plane shaft,
   a gimbal system including a hoop suspended above said orbit plane shaft and pivotable about a first orthogonal axis of said gimbal system,
   a pair of gimbal arms pivotally affixed to said hoop and pivotable about a second orthogonal axis of said gimbal system, and
   a sleeve bearing slidable on said pointer rod and affixed to each of said gimbal arms for aligning said pointer rod with the intersection of said first and second orthogonal axes of said gimbal system upon pivotable movement of said orbit plane shaft.

6. The structure of claim 5 and further including,
   means for adjusting the elevation of said orbit plane shaft, and
   means for adjusting the effective length of said orbit plane shaft.

7. The structure of claim 6 and further including,
   means for adjusting the initial azimuth of said orbit plane shaft.

8. The mechanical analog computer of claim 7 and further including, means on said hoop for continuously indicating its angular position about the first orthogonal axis of said gimbal system throughout the movement of the orbit plane shaft.

9. The mechanical analog computer of claim 8 and further including, means on one of said gimbal arms for continuously indicating its angular position about the second orthogonal axis of said gimbal system throughout the movement of said orbit plane shaft.

References Cited

UNITED STATES PATENTS

| | | |
|---|---|---|
| 2,367,128 | 1/1945 | Jorgenson. |
| 3,163,935 | 1/1965 | Webb. |
| 3,195,243 | 7/1965 | Sundblad _____ 35—46 |
| 3,205,593 | 9/1965 | Busey _____ 35—46 |

WILLIAM D. MARTIN, Primary Examiner